US011881127B2

(12) United States Patent
Kaye et al.

(10) Patent No.: US 11,881,127 B2
(45) Date of Patent: Jan. 23, 2024

(54) BAND SEAL

(71) Applicant: J.J. Keller & Associates, Inc., Neenah, WI (US)

(72) Inventors: Alex Julian Kaye, Fond du Lac, WI (US); Kevin Roger Kucksdorf, Hortonville, WI (US)

(73) Assignee: J. J. Keller & Associates, Inc., Neenah, WI (US)

( * ) Notice: Subject to any disclaimer, the term of this patent is extended or adjusted under 35 U.S.C. 154(b) by 618 days.

(21) Appl. No.: 17/097,177

(22) Filed: Nov. 13, 2020

(65) Prior Publication Data

US 2022/0157202 A1 May 19, 2022

(51) Int. Cl.

| | |
|---|---|
| ***G09F 3/03*** | (2006.01) |
| ***E05B 83/10*** | (2014.01) |
| ***B65D 90/22*** | (2006.01) |
| ***G09F 3/00*** | (2006.01) |

(52) U.S. Cl.

CPC ............. *G09F 3/037* (2013.01); *B65D 90/22* (2013.01); *E05B 83/10* (2013.01); *G09F 3/0292* (2013.01); *G09F 3/0341* (2013.01); *B65D 2211/00* (2013.01)

(58) Field of Classification Search

CPC ........ G09F 3/03; G09F 3/0305; G09F 3/0341; G09F 3/037; G09F 3/04; G09F 3/08; G09F 3/10; G09F 3/0292; E05B 39/02; E05B 83/10; Y10T 292/48; Y10T 292/481; Y10T 292/485; Y10T 292/488; Y10T 292/491; Y10T 292/496; Y10T 292/499; Y10T 292/507; B65D 90/22; B65D 2211/00

See application file for complete search history.

(56) References Cited

U.S. PATENT DOCUMENTS

| | | | | |
|---|---|---|---|---|
| 3,149,869 A * | 9/1964 | Chamberlin | ............ | G09F 3/037<br>292/320 |
| 3,600,027 A | 8/1971 | Noland | | |
| 3,718,355 A | 2/1973 | Canter | | |
| 4,361,351 A | 11/1982 | Spirig | | |
| 4,501,049 A | 2/1985 | Adamson | | |
| 4,506,415 A | 3/1985 | Swift | | |

(Continued)

FOREIGN PATENT DOCUMENTS

| | | | |
|---|---|---|---|
| DE | 19738540 A1 * | 3/1999 | ........... G09F 3/0341 |
| WO | WO-9527968 A2 * | 10/1995 | ............. G09F 3/037 |

OTHER PUBLICATIONS

Machine Translation for DE 19738540 A1 (Year: 1999).*

*Primary Examiner* — Christine M Mills
*Assistant Examiner* — Christopher F Callahan
(74) *Attorney, Agent, or Firm* — Boyle Fredrickson, S.C.

(57) ABSTRACT

A band seal having a strap including a head portion, a tail portion and a middle portion, a retainer, an adhesive pad and a release liner secured to the adhesive pad, wherein the band seal is positionable into three positions including a pre-attached position wherein the middle portion of the strap is in a non-looped orientation, a temporary position wherein the middle portion of the strap is in a looped orientation and the retainer holds the middle portion in this looped orientation with the tail portion being concentric with the middle portion, and an attached position wherein the release liner is removed from the adhesive pad and the tail portion is secured to the adhesive pad.

7 Claims, 14 Drawing Sheets

(56) References Cited

U.S. PATENT DOCUMENTS

| | | | | |
|---|---|---|---|---|
| 4,676,535 | A | 6/1987 | Mautner | |
| 4,968,075 | A | 11/1990 | Lesquir et al. | |
| 5,219,194 | A * | 6/1993 | Trent | G09F 3/0352 292/307 R |
| 6,283,517 | B1 | 9/2001 | Nazzari | |
| 6,536,082 | B2 | 3/2003 | Berrocal et al. | |
| 8,388,025 | B2 * | 3/2013 | Mrocki | G09F 3/0335 40/6 |
| 10,280,657 | B2 | 5/2019 | Griesedieck et al. | |
| 10,569,946 | B2 | 2/2020 | Vaverka | |
| 2004/0060216 | A1 * | 4/2004 | Riley | B42D 15/00 40/633 |
| 2010/0200155 | A1 * | 8/2010 | Mrocki | E05B 73/0029 156/212 |

* cited by examiner

BAND SEAL

FIELD OF THE INVENTION

The present disclosure is in the field of cargo security seals and, more particularly, band seals for attachment to a locking hasp such as on a trailer door or a tanker hatch.

BACKGROUND OF THE INVENTION

Band seals are commonly used to secure doors and hatches. In particular, band seals are used to secure trailer doors and tanker trailer hatches by threading the one-time use band seal through a locking hasp. The purpose of the band seal is to show evidence of tampering and deter unauthorized access to contents such as cargo in the trailer or tanker. Band seals have historically been constructed of plastic or tin/metal materials. They can be removed by hand due to their relatively low break strength of typically 20 to 100 lbf.

SUMMARY OF THE INVENTION

In one construction, the disclosure provides a band seal including a strap including a head portion, a middle portion and a tail portion, a retainer, an adhesive pad and a release liner secured to the adhesive pad. The band seal is positionable into three positions including a pre-attached position wherein the middle portion of the strap is in a non-looped orientation, a temporary position wherein the middle portion of the strap is in a looped orientation and the retainer holds the middle portion in this looped orientation with the tail portion being concentric with the middle portion, and an attached position wherein the release liner is removed from the adhesive pad and at least a part of the tail portion is secured to the adhesive pad.

In another construction, the disclosure provides a band seal including a strap having a head portion, a tail portion, a pair of shoulders, and a slot, the slot dimensioned to enable the head portion to pass therethrough, and the shoulders adapted to engage a portion of the strap adjacent the slot to hold the strap in a temporary position, an adhesive pad on the strap adjacent the shoulders and a release liner secured to the adhesive pad and removable from the adhesive pad after the strap is in the temporary position to enable the tail portion to adhere to the adhesive pad.

In another construction, the disclosure provides a band seal including a strap having a head portion, a tail portion and a restrainer, an adhesive pad on the strap and a release liner secured to the adhesive pad and removable from the adhesive pad to detach from the strap and to enable at least a part of the tail portion to adhere to the adhesive pad, the first release liner having identification indicia thereon. The restrainer is adapted to hold the strap in a temporary position and adapted to align the tail portion with the adhesive pad before the at least a part of the tail portion adheres to the adhesive pad.

In another construction, the disclosure provides a band seal including an elongate strap having a head portion, a tail portion, a pair of shoulders, identification indicia and a slot, the slot dimensioned to enable the head portion to pass therethrough and the shoulders adapted to engage a portion of the strap adjacent the slot and hold the strap in a temporary position, an adhesive pad on the strap adjacent the shoulders, a first release liner secured to the adhesive pad and removable from the adhesive pad to detach from the strap after the strap is in the temporary position to enable at least a part of the tail portion to adhere to the adhesive pad, the first release liner having identification indicia thereon and a second release liner secured to and removable from the first release liner to enable the first release liner to be secured to a surface.

In another construction, the disclosure provides band seal comprising a strap having a head portion, a middle portion, and a tail portion, the middle portion having indicia thereon, and the tail portion having a first part and having a second part with indicia thereon and being releasably secured to the first part; an adhesive pad on the strap; and a release liner secured to the adhesive pad and removable from the adhesive to enable the first part of the tail portion to adhere to the adhesive pad; wherein the second part of the tail portion is optionally removable from the band seal after the first part of the tail portion is adhered to the adhesive pad.

Other aspects of the disclosure will become apparent by consideration of the detailed description and accompanying drawings.

DETAILED DESCRIPTION

Before any constructions of the disclosure are explained in detail, it is to be understood that the disclosure is not limited in its application to the details of construction and the arrangement of components set forth in the following description or illustrated in the following drawings. The disclosure is capable of other constructions and of being practiced or of being carried out in various ways.

Figure 1:
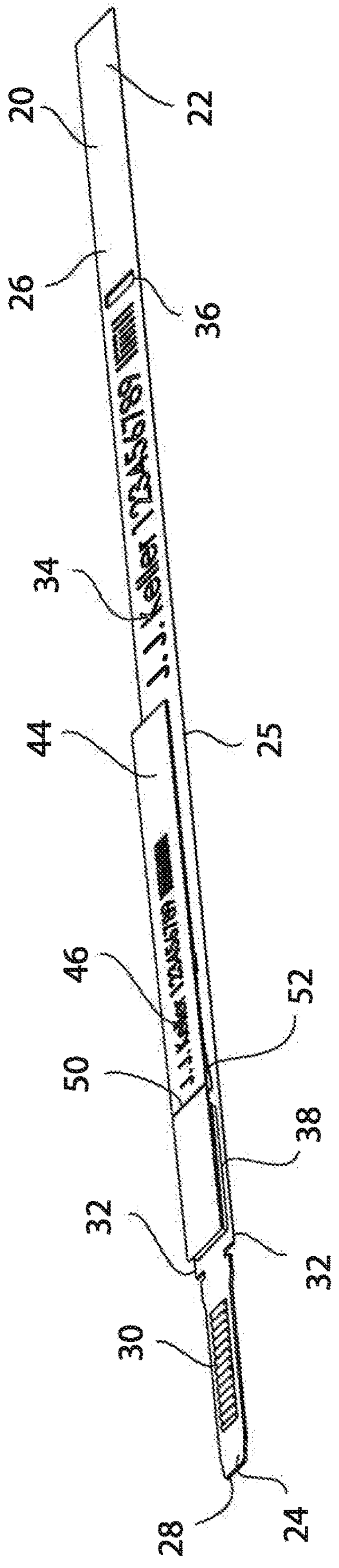
FIG. 1 is a perspective view of a band seal of the present invention.
Figure 2:
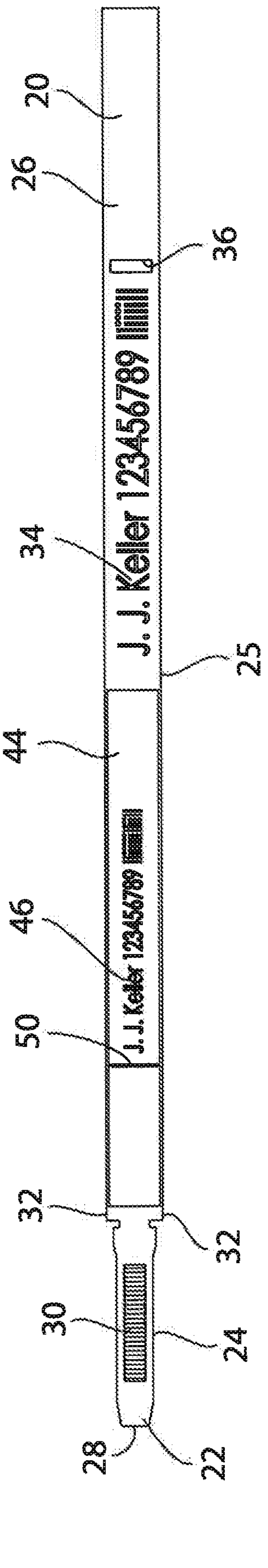
FIG. 2 is a top view of the band seal.
Figure 3:
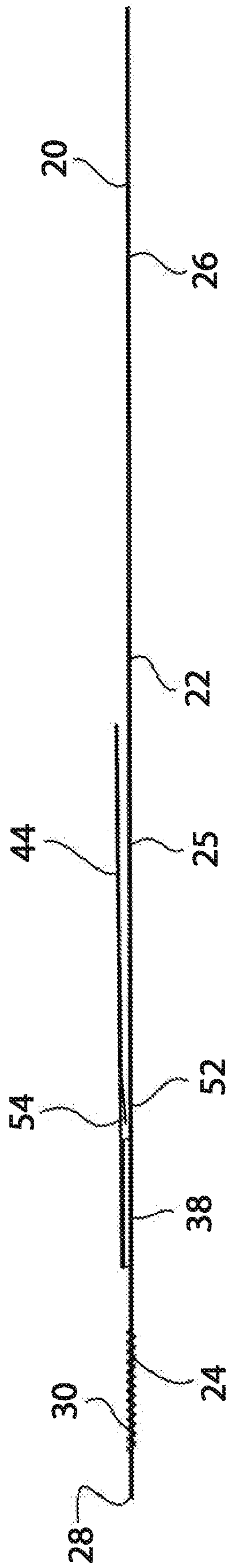
FIG. 3 is a side view of the band seal.
Figure 4:
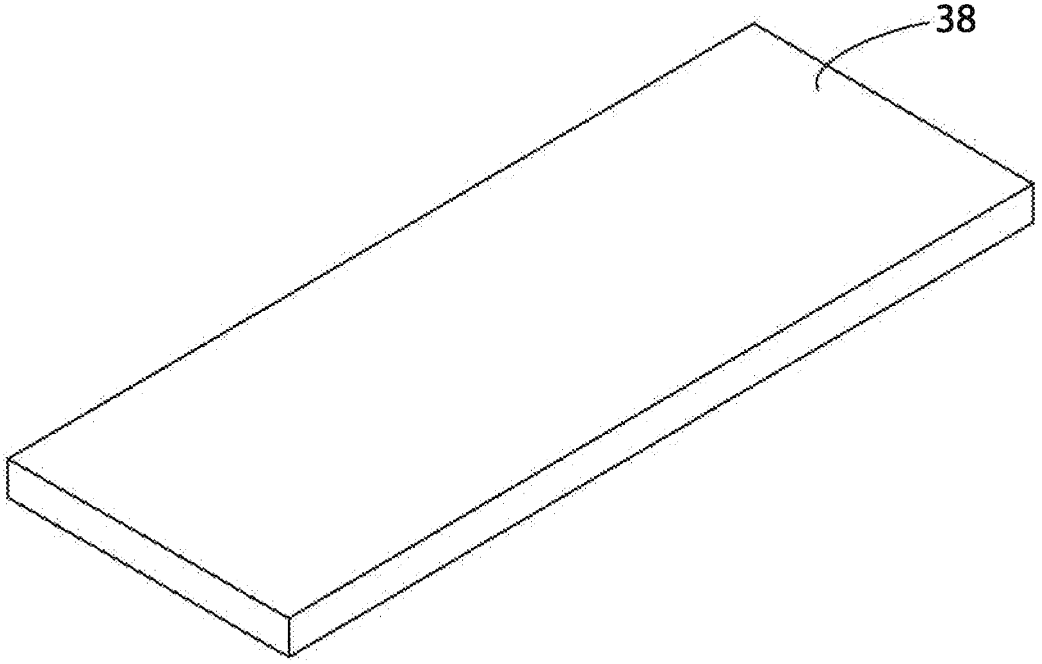
FIG. 4 is a perspective view of an adhesive pad.

FIGS. 1-3 illustrate a band seal 20 in accordance with the present disclosure. The band seal 20 includes an elongate strap 22 having a head portion 24, a middle portion 25 and a tail portion 26. The head portion terminates in a tip 28 which is preferably angle cut, however, other geometries can also be utilized. The head portion 24 includes a finger grip 30 such as small serrations to enable gripping of the strap 22 by a user. The strap 22 includes a pair of shoulders 32 and preferably identification indicia 34 such as serial numbers, customer logo, bar code, QR or other identifying data or indicia, for example. The strap 22 includes a slot 36 which has a geometry which enables the head portion 24 to pass therethrough. The slot 36 as shown is rectangular, however, other geometries can also be utilized. The strap 22 preferably has smooth radius edges to be safer for users to handle than a hard snap-off plastic or metal band seal which can cause cuts or abrasions.

As shown in FIG. 1-4, an adhesive pad 38 is positioned adjacent the head portion 24, The adhesive pad 38 is preferably rectangular as shown in the drawings, however, other geometries can also be utilized.

Figure 5:
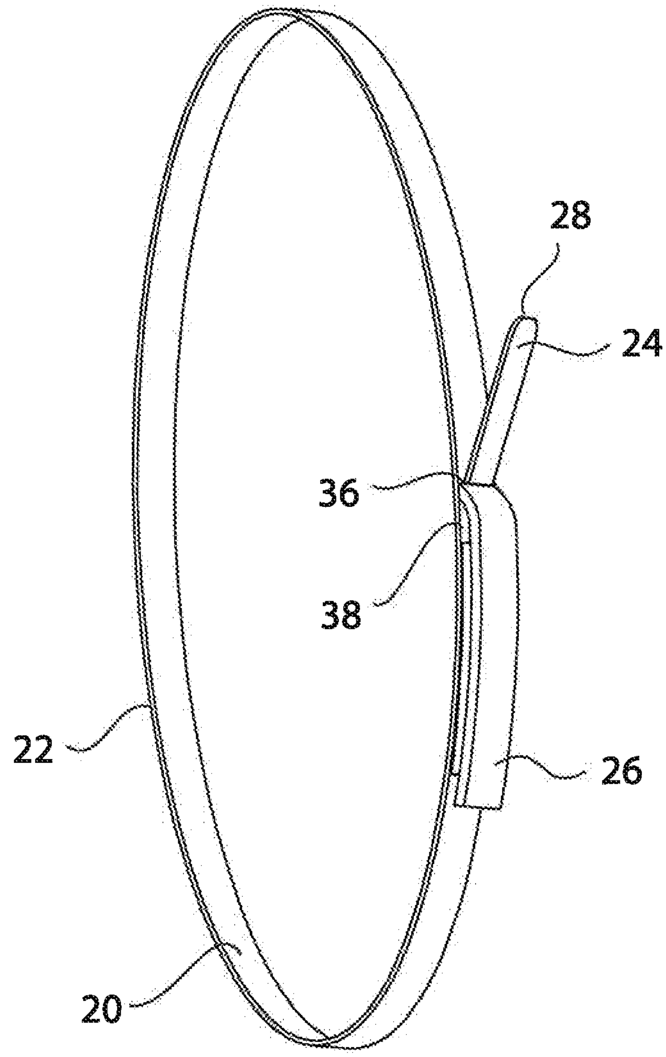
FIG. 5 is perspective view of the band seal in the attached position.
Figure 6:
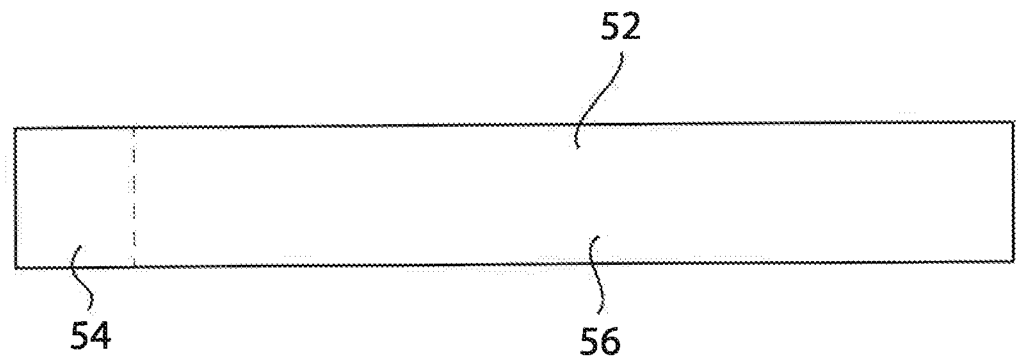
FIG. 6 is a top view of a second release liner.

Referring to FIG. 5, the tip 28 and head portion 24 are adapted to be pulled through the slot 36 such that the shoulders 32 engage the strap 22 adjacent the slot 36 and temporarily hold the strap 22 in this looped position. The shoulders 32 prevents the head portion 24 from slipping back through the slot 36. The shoulders 32 also enable the alignment of the tail portion 26 with the adhesive pad 38.

Turning back to FIGS. 1-3, the band seal 20 includes a release liner 44 whereby at least part of the release liner 44 is releasably secured to the adhesive pad 38. The release liner 44 serves as a pre-attached ID tag for the band seal 20 and serves as a release liner for the adhesive pad 38. The release liner 44 is preferably pre-printed with identification indicia 46 such as serial numbers, customer logo, bar code, QR or other identifying data or other indicia and is a security feature. Preferably, the identification indicia 34 on the strap 22 matches the identification indicia 46 on the release liner 44. The release liner 44 includes an adhesive on its underside. The release liner 44 optionally includes tear off perforations 50.

As shown in FIGS. 1-3 and 6, a second release liner 52 is removably attached to the release liner 44 via adhesive. The second release liner 52 is preferably rectangular, however, other geometries can also be utilized. The second release liner 52 includes one portion 54 not secured to the release liner 44 and a second portion 56 secured to the release liner 44. The second release liner 52 is adapted to be removed from the release liner 44.

The strap 22 of the band seal 20 is preferably manufactured from a semi-rigid plastic extrusion such as strapping currently used in the shipping industry, however, any mass scale or similar plastic, ferrous, non-ferrous or composite material can also be utilized for economies of scale such as any band type strip. The adhesive pad 38 is preferably manufactured from acrylic or urethane using an adhesive such as very high bond (VHB) from 3M or others. The release liners 44 and 52 are preferably manufactured from polyethylene, polypropylene, polytetrafluoroethylene, polyester, acetyl, polyvinyl chloride, or silicone.

The strap 22 can be colored for unique identification or branding.

Due to the compact form factor of the band seal 20, multiple band seals take up far less space when stored as compared to other band seals. For example, a carton of 1,000 molded prior art plastic truck seals measures approximately 11"×11"×9." A carton of 1,000 band seals 20 will measure approximately 12"×12"×2".

Figure 7:
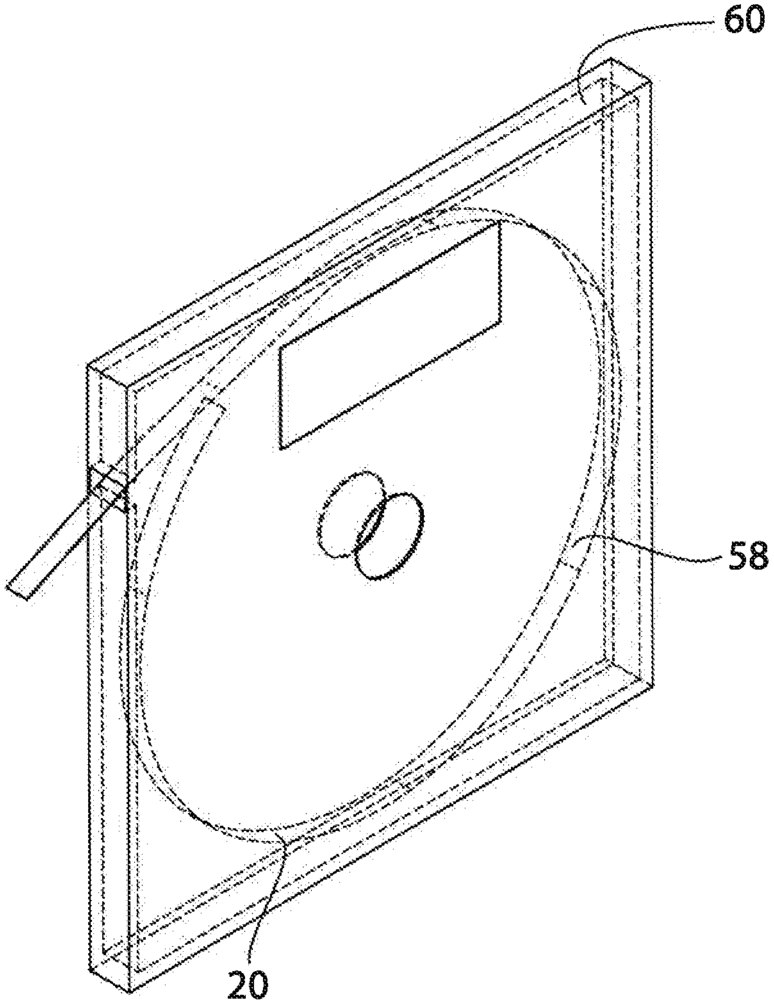
FIG. 7 is a perspective view of a dispensing system for multiple band seals.

As shown in FIG. 7, the band seal 20 can be designed to be dispensed from a dispensing system such as a roll 58 within a carton 60. The roll 58 includes multiple band seals 20 wherein the head portion 24 of one band seal 20 is releasably secured to the tail portion 26 of an adjacent band seal 20 and so on. This head portion 24 to tail portion 26 connection is breakable by a user so as to separate one band seal 20 from the roll 58, similar to tearing off raffle tickets from a roll.

Figure 8:
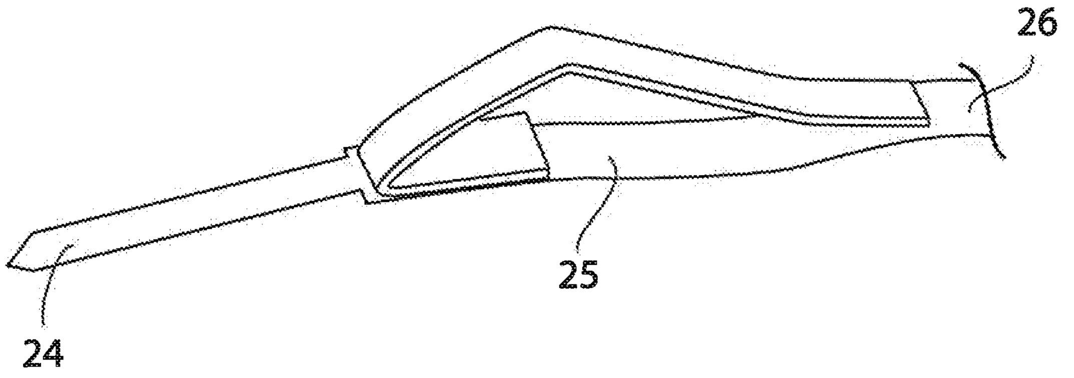
FIG. 8 is a perspective view of the band seal in a pre-attached position.
Figure 9:
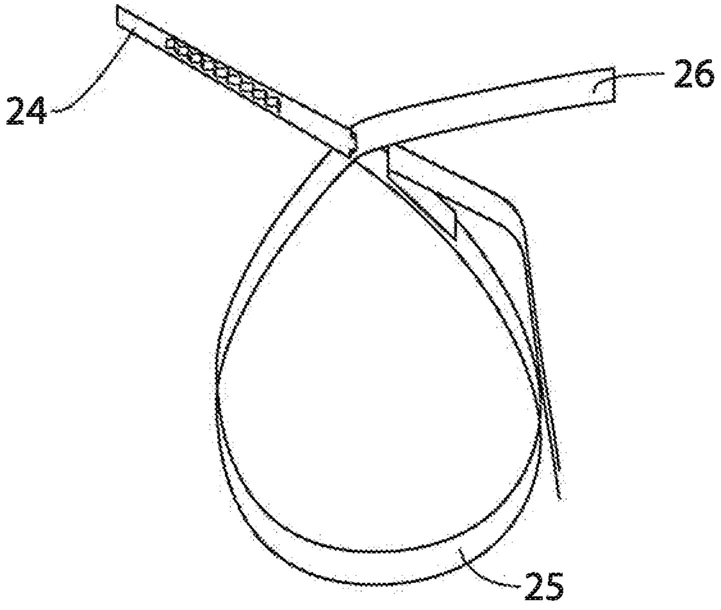
FIGS. 9-13 are perspective views of the band seal being installed.

Turnings to FIGS. 8-14, the installation and use of the band seal 20 is shown. In FIG. 8, the band seal 20 is shown in its pre-attached state where the middle portion 25 is in a non-looped or approximately flat position. When an enclosure such as a trailer or tanker for example needs to be secured with the band seal 20, a user positions the band seal 20 through an opening such as a locking hasp (not shown). The user then inserts or feeds the head portion 24 through the slot 36 until the shoulders 32 engage with the strap 22 adjacent the slot 36 to hold the strap 22 in a temporary position that forms a loop configuration. The shoulders 32 act as a restrainer to hold the strap 22 in the temporary position. It should be noted that other restrainers in addition to the illustrated shoulders 32 can also be utilized to hold the strap in the temporary position such as threading through a locking hasp, hasp mechanism, and the like. In this temporary position, the head portion 24 cannot slide back through the slot 36, the user does not have to hold the head portion 24 or tail portion 26 in this loop configuration, and the tail portion 26 is in general concentric alignment with the adhesive pad 38, as is shown in FIG. 9.

Figure 10:
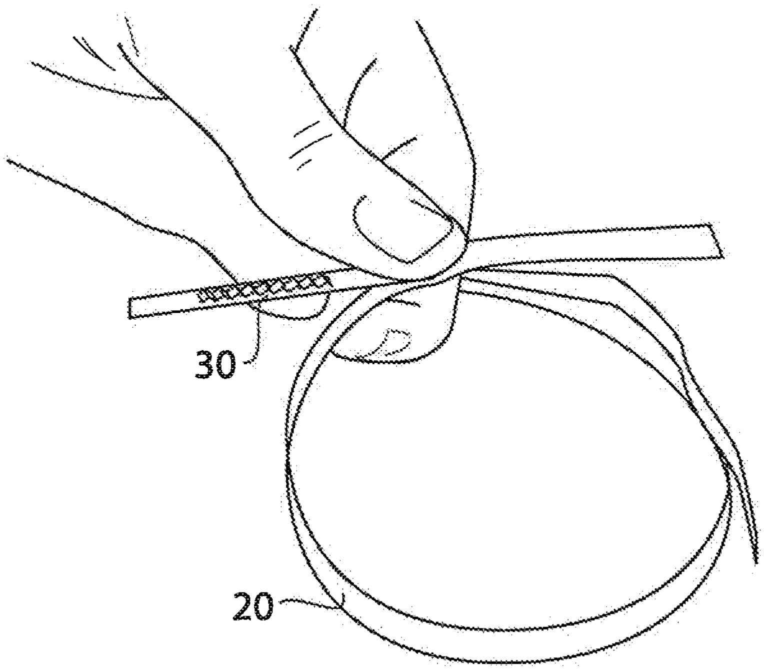
Figure 11:
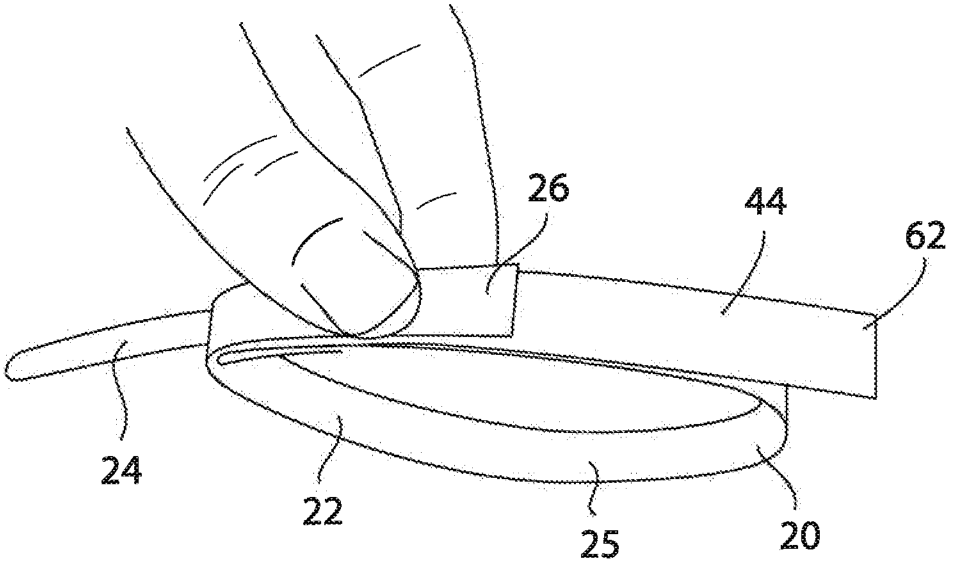
Figure 12:
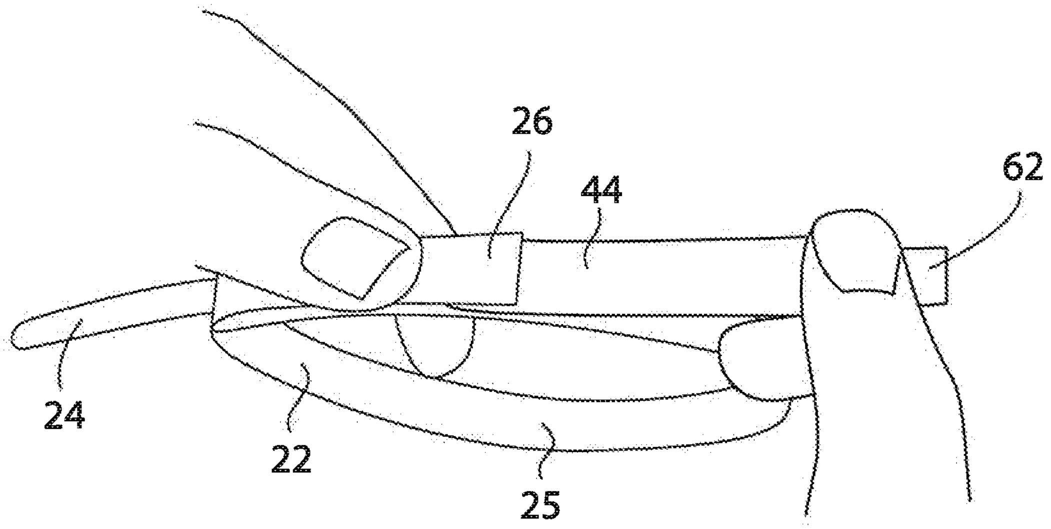

In this looped temporary position, the user can grasp the band seal 20 with their thumb and index finger using the finger grip 30 if needed as shown in FIG. 10. As shown in FIG. 11, the user pinches the tail portion 26 to the strap 22 with the release liner 44 therebetween such that the tail portion 26, strap 22 and release liner 44 are all concentrically aligned one atop each other so that the tail portion 26 will be properly and completely adhered to the adhesive pad 38. As shown in FIG. 12, the user then pulls an end 62 of the release liner 44 while maintaining the pinch. The release liner 44 pulls away from the adhesive pad 38 disengaging entirely from the band seal 20. The user further pinches the tail portion 26 to the adhesive pad 38 to secure the band seal 20 in its attached position.

Figure 13:
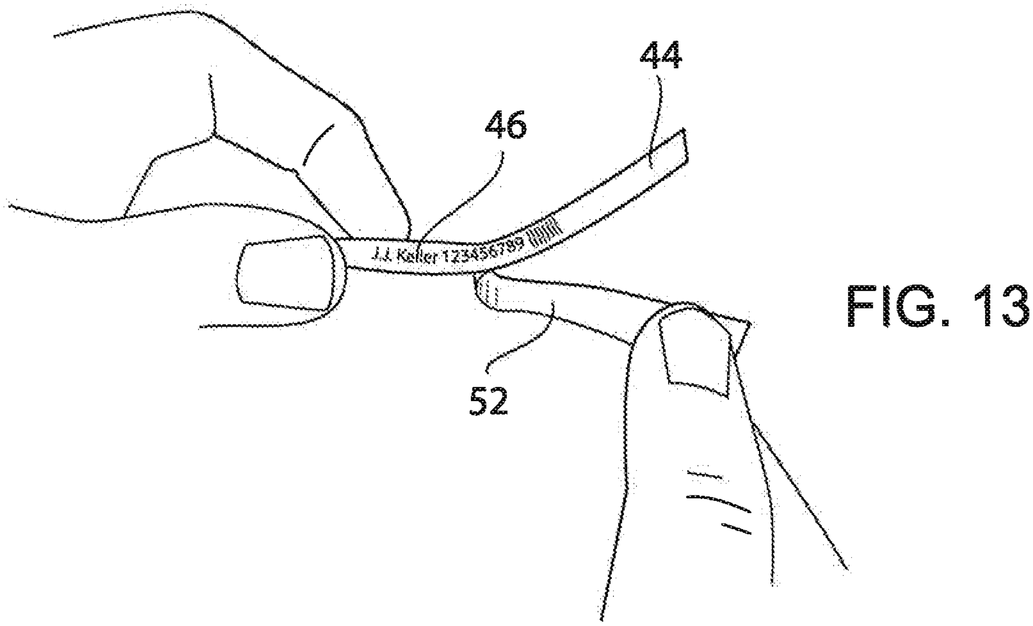
Figure 14:
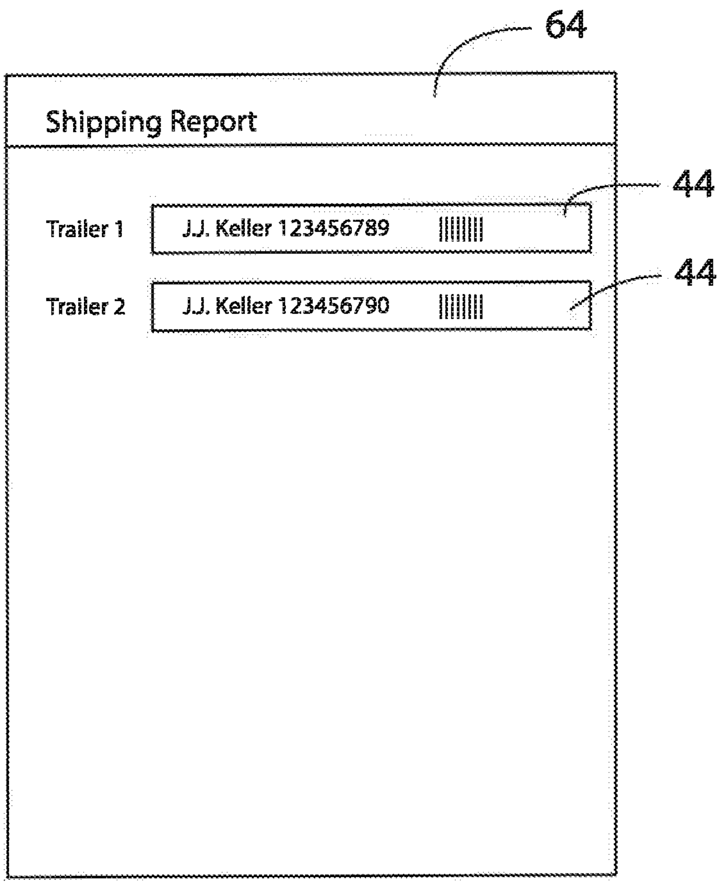
FIG. 14 is a top view of an exemplary report with a first release liner attached thereto.

The now detached release liner 44 acts as an ID tag for tracking purposes. As shown in FIG. 13, the user can pull off the second release liner 52 from the release liner 44. As shown in FIG. 14, the user can now secure the release liner 44 to forms 64 such as a tracking form, report, shipping documentation or the like. If the release liner 44 has perforations 50, the release liner 44 can be separated at the perforations 50 and the part with the identification indicia 46 thereon can attach to the forms or paper if a smaller ID tag is desired.

Evidence of tampering or attempts to remove the band seal 20 will be clearly indicated by stress or damage to the adhesive pad 38 and/or damage to the strap 22.

Figure 15:
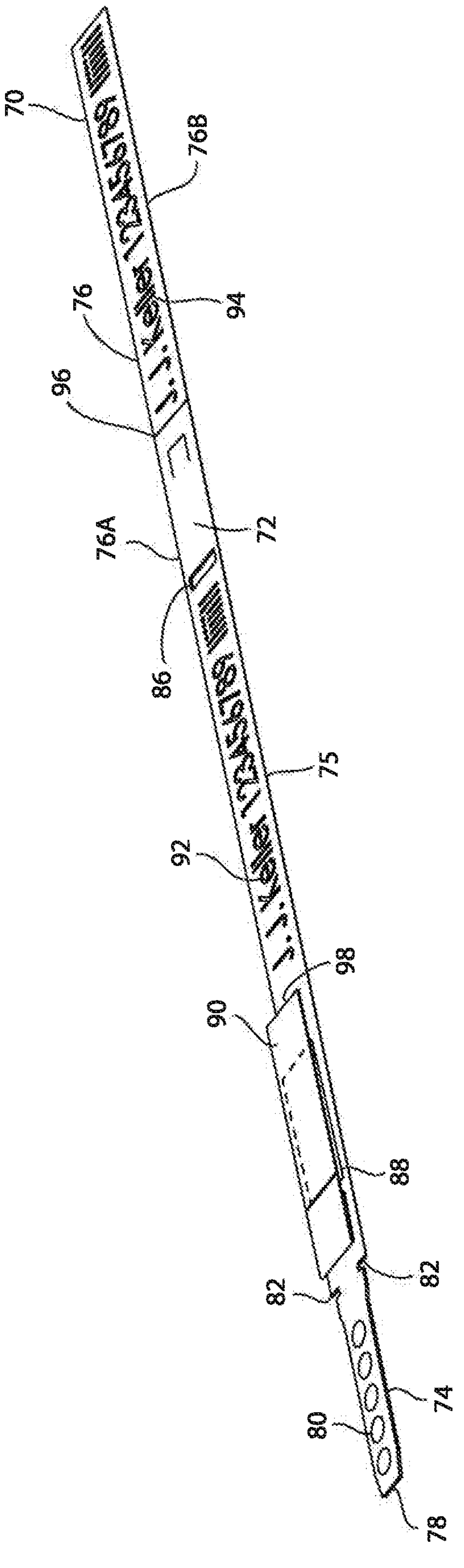
FIG. 15 is a perspective view of a second embodiment of a band seal.
Figure 16:
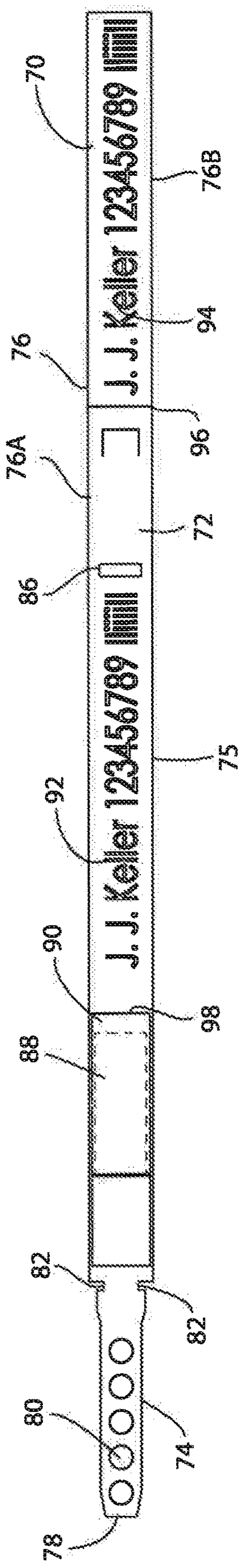
FIG. 16 is a top view of the second embodiment of the band seal.
Figure 17:
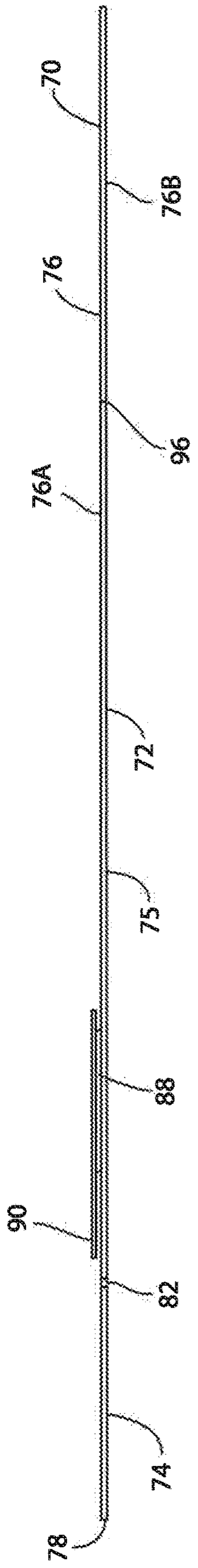
FIG. 17 is a side view of the second embodiment of the band seal.

Turning now to FIGS. 15-17, there is shown a second embodiment 70 of a band seal according to the invention. The band seal 70 includes an elongate strap 72 having a head portion 74, a middle portion 75 and a tail portion 76. The head portion 74 terminates in a tip 78 which is preferably angle cut, however, other geometries can also be utilized. The head portion 74 includes a finger grip 80 such as small serrations to enable gripping of the strap 72 by a user. The tail portion 76 has a first part 76A and a second part 76B. The strap 72 includes a restrainer such as a pair of shoulders 82 and a slot 86 which has a geometry which enables the head portion 74 to pass therethrough. The slot 86 as shown is rectangular, however, other geometries can also be utilized. The strap 72 preferably has smooth radius edges to be safer for users to handle than a hard snap-off plastic or metal band seal which can cause cuts or abrasions.

An adhesive pad 88 is positioned adjacent the head portion 74. The adhesive pad 88 is preferably rectangular as shown in the drawings, however, other geometries can also be utilized.

Similar to the band seal 20, with the band seal 70, the tip 78 and head portion 74 are adapted to be pulled through the slot 86 such that the shoulders 82 engage the strap 72 adjacent the slot 86 and hold the strap 72 in this looped position. The shoulders 82 prevents the head portion 74 from slipping back through the slot 86. The shoulders 82 also enable the alignment of the first part of the tail portion 76A with the adhesive pad 88.

The band seal 70 includes a release liner 90 releasably covering the adhesive pad 88. The middle portion 75 of the strap 72 includes indicia 92 such as serial numbers, customer logo, bar code, QR or other identifying data or indicia, for example. The tail portion 76B includes indicia 94 such as serial numbers, customer logo, bar code, QR or other identifying data or indicia, for example. Preferably the indicia 92 and 94 are the same. Perforations 96 on the strap 72 separate the first and second parts of the tail portion 76A and 76B. Optionally, there is adhesive on the tail portion 76B on the side opposite the indicia 94.

The installation and use of the band seal 70 is similar to that of the band seal 20 described above with the following differences. In this looped temporary position, the user can grasp the seal 70 with their thumb and index finger using the finger grip 80 if needed. The user pinches the first part of the tail portion 76A to the strap 72 with the release liner 90 therebetween such that the tail portion 76, strap 72 and release liner 90 are all concentrically aligned one atop each other so that the first part of the tail portion 76A will be properly and completely adhered to the adhesive pad 88. The user pulls an end 98 of the release liner 90 while maintaining the pinch. The release liner 90 pulls away from the adhesive pad 88 disengaging entirely from the seal 70. The user further pinches the first part of the tail portion 76A to the adhesive pad 88 to secure the band seal 70 in its attached position. If desired, the user can remove the second part of the tail portion 76B by tearing at the perforations 96. The second part of the tail portion 76B with indicia 94 can then be secured to items such as a tracking form, report, shipping documentation or the like.

Various features and advantages of the invention are set forth in the following claims.

What is claimed is:

1. A band seal comprising:

a strap having a head portion, a tail portion and a slot, the slot dimensioned to enable the head portion to pass therethrough;

an adhesive pad on the strap; and a first release liner secured to the adhesive pad and removable from the adhesive pad to enable the tail portion to adhere to the adhesive pad, wherein the first release liner includes an adhesive under a second release liner to enable the first release liner to be secured to a surface.

2. The band seal of claim 1 wherein the surface includes an identification report.

3. A band seal comprising:

a strap having a head portion and a tail portion;

an adhesive pad on the strap;

a first release liner secured to the adhesive pad and removable from the adhesive pad to detach from the strap and to enable at least a part of the tail portion to adhere to the adhesive pad; and a second release liner secured to and removable from the first release liner.

4. A band seal comprising:

an elongate strap having a head portion, a tail portion, a pair of shoulders, identification indicia and a slot, the slot dimensioned to enable the head portion to pass therethrough and the shoulders adapted to engage a portion of the strap adjacent the slot and hold the strap in a temporary position;

an adhesive pad on the strap adjacent the shoulders;

a first release liner secured to the adhesive pad and removable from the adhesive pad to detach from the strap after the strap is in the temporary position to enable at least a part of the tail portion to adhere to the adhesive pad, the first release liner having identification indicia thereon; and a second release liner secured to and removable from the first release liner to enable the first release liner to be secured to a surface.

5. The band seal of claim 4 wherein the head portion includes finger grips.

6. The band seal of claim 4 wherein the first release liner includes adhesive under the second release liner to enable the first release liner to be secured to the surface.

7. The band seal of claim 4 wherein the identification indicia on the strap and on the first release liner match.

* * * * *